US010699832B2

(12) United States Patent
Wang et al.

(10) Patent No.: US 10,699,832 B2
(45) Date of Patent: Jun. 30, 2020

(54) ELECTROMAGNETIC CONTROL DEVICE

(71) Applicant: Schaeffler Technologies AG & Co. KG, Herzogenaurach (DE)

(72) Inventors: Yi Wang, Nuremberg (DE); Jens Hoppe, Erlangen (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 50 days.

(21) Appl. No.: 15/757,181

(22) PCT Filed: Nov. 9, 2016

(86) PCT No.: PCT/DE2016/200511
§ 371 (c)(1),
(2) Date: Mar. 2, 2018

(87) PCT Pub. No.: WO2017/084662
PCT Pub. Date: May 26, 2017

(65) Prior Publication Data
US 2018/0254133 A1 Sep. 6, 2018

(30) Foreign Application Priority Data
Nov. 17, 2015 (DE) ........................ 10 2015 222 649

(51) Int. Cl.
*H01H 9/02* (2006.01)
*H01F 7/16* (2006.01)
(Continued)

(52) U.S. Cl.
CPC .............. *H01F 7/16* (2013.01); *F01L 1/3442* (2013.01); *F01L 1/46* (2013.01); *H01F 7/128* (2013.01);
(Continued)

(58) Field of Classification Search
CPC ...................................................... H01H 50/02
(Continued)

(56) References Cited

U.S. PATENT DOCUMENTS 2,907,851 A 10/1959 Moorhead et al.
3,727,160 A * 4/1973 Churchill ................ F16B 21/16 335/251
(Continued)

FOREIGN PATENT DOCUMENTS

DE 1955814 10/1970
DE 10211467 9/2003
(Continued)

*Primary Examiner* — Alexander Talpalatski
(74) *Attorney, Agent, or Firm* — Volpe and Koenig, P.C.

(57) ABSTRACT

An electromagnetic control device (2), having a housing (6), which has a plastic overmolding (7) and a unit for fastening to a component (5) that holds the electromagnetic control device (fastening unit (9)). A connection is provided between the electromagnetic control device and the holding component. This is achieved in that the fastening unit (9) has at least one locking clip (10) and one housing-side locking-clip holder (11), and the locking clip (10) has two legs (12), a connection section (13), and a locking section (14) on at least one leg (12).
The locking section (14) is designed to interact with a locking contour (21) of the component (5) that holds the electromagnetic control device (2).

8 Claims, 2 Drawing Sheets

(51) Int. Cl.
*F01L 1/344* (2006.01)
*F01L 1/46* (2006.01)
*H01F 7/128* (2006.01)

(52) U.S. Cl.
CPC .................. *F01L 2001/3443* (2013.01); *F01L 2001/34426* (2013.01); *F01L 2103/00* (2013.01)

(58) Field of Classification Search
USPC .......................................................... 335/202
See application file for complete search history.

(56) References Cited

U.S. PATENT DOCUMENTS

| | | | | |
|---|---|---|---|---|
| 4,683,453 | A * | 7/1987 | Vollmer | H01F 7/1607<br>335/255 |
| 4,805,870 | A * | 2/1989 | Mertz | F16K 31/0655<br>251/129.15 |
| 4,871,989 | A * | 10/1989 | Gross | F02M 63/0205<br>335/164 |
| 5,581,222 | A * | 12/1996 | Pinaud | H01F 7/06<br>251/129.15 |
| 6,179,268 | B1 | 1/2001 | Seid | |
| 7,011,059 | B2 | 3/2006 | Plank et al. | |
| 7,704,008 | B2 * | 4/2010 | Shinozaki | F16B 21/186<br>24/567 |
| 8,632,054 | B2 * | 1/2014 | Carlson | F16K 31/043<br>251/128 |
| 8,648,680 | B2 * | 2/2014 | Adler | F16K 31/0675<br>335/260 |
| 8,809,722 | B2 * | 8/2014 | Chen | H01H 77/02<br>218/154 |
| 10,170,226 | B2 * | 1/2019 | Nielsen | H01F 6/06 |
| 2011/0247580 | A1 * | 10/2011 | Keller | F01L 1/3442<br>123/189 |
| 2017/0002700 | A1 | 1/2017 | Bender et al. | |

FOREIGN PATENT DOCUMENTS

| | | |
|---|---|---|
| DE | 69920794 | 2/2006 |
| DE | 102010012917 | 4/2011 |
| DE | 102013114625 | 6/2015 |
| GB | 1249950 | 10/1971 |
| WO | 2015090741 | 6/2015 |

* cited by examiner

ELECTROMAGNETIC CONTROL DEVICE

BACKGROUND

The invention concerns the field of proportional magnets that are used as electromagnetic control elements for actuating hydraulic directional valves. Electromagnetic control elements forming the class are used, for example, as central magnets for controlling a hydraulic camshaft adjuster of an internal combustion engine.

Such an arrangement including a hydraulic camshaft adjuster, a control valve, and an electromagnetic control element is known, for example, from DE 102 11 467 A1, which includes a pressing proportional magnet as an element. The shown proportional magnet comprises, among other things, a magnetic coil that encloses a coil space and an armature that is arranged within a coil space so that it is displaceable in the axial direction and a pole core that bounds the coil space at one axial end. The armature is connected rigidly to a push rod. The push rod passes through the pole core at an opening and contacts and end surface of a control valve held partially by a camshaft. The control valve housing carries a rotor of the camshaft adjuster.

Magnetic coils, armatures, pole cores, and at least partially the push rods are arranged in a magnet housing. DE 102 11 467 A1 also shows a magnet housing with a flange that is used for fastening the magnet housing on a cover of the control drive. The magnet housing and control drive cover are connected to each other by a threaded connection. In certain applications, there is the need to simplify the connection between the magnet housing and holding component, for example, a control drive cover.

DE 10 2010 012 917 A1 shows one possible simplification of the connection. The fastening of the magnet housing is realized, in this case, by a so-called bayonet coupling, in that two radially outward extending projections on the magnet housing interact with two hook-shaped holders on the holding component: through a rotational movement about the axis of the electromagnet, the outward extending projections are pushed under the hook-shaped holder; the installation sequence consequently comprises a movement in the axial direction and a subsequent rotational movement. Certain applications require even more simplification of the connection.

SUMMARY

Thus, the object of the invention is to provide an electromagnetic control device whose installation is improved.

The solution of meeting this objective is given from one or more features of the invention; advantageous refinements and constructions of the invention are described below and in the claims. Accordingly, the object is achieved by an electromagnetic control device with a housing that has a plastic overmolding and a unit for fastening to a component (fastening unit) holding the electromagnetic control device. The fastening unit comprises at least one locking clip and one housing-side locking clip holder, wherein the locking clip has two legs and a connection section and a locking section on at least one leg, wherein the locking section is formed for interacting with a locking contour of the component holding the electromagnetic control device.

The fastening of the housing on a component holding the electromagnetic control device can thus be simplified: the installation requires only a movement in the axial direction, a subsequent rotational movement can be omitted. Other advantages are produced if, due to limited installation space availability, the force that is required for the fastening of the known magnet housing cannot be applied.

The electromagnetic control device can be fastened, in particular, to an internal combustion engine or a component of an internal combustion engine. The component of the internal combustion engine can be, in particular, the component holding the electromagnetic control device. The component holding the electromagnetic control device can be, in particular, the cover of the control drive, for example, the cover of the chain drive.

In one advantageous construction, the electromagnetic control device includes an armature, whose longitudinal axis defines an axis of the electromagnetic control device. The two legs can be tensioned against each other, wherein the direction of the tensioning force runs essentially tangential to a circular line drawn around the axis of the electromagnetic control device. The auxiliary construction of a circular line drawn around the axis of the electromagnetic control device enables a definition of the tensioning force that does not point in the direction of the axis profile—in contrast to embodiments known from the prior art with a bayonet coupling. The construction of the fastening unit can thus be simplified in an advantageous way.

The legs are tensioned relative to each other especially in the installation on the component holding the electromagnetic control device. After successful installation, the legs can basically go back into a tension-free state.

Another advantageous embodiment is distinguished by a locking section that is formed by an indentation pointing toward the opposite leg. Accordingly, the indentation can be formed on one of the legs of the locking device or on both. An advantageous refinement of the embodiment concerns an indentation that is shaped for locking on a locking contour of the component holding the electromagnetic control device. Thus, advantageously, a connection by locking with reliable durability can be created in that the indentation points in a direction that corresponds to the direction of the tensioning force.

In another advantageous embodiment, the electromagnetic control device includes an electromagnet unit with an armature, whose longitudinal axis defines an axis and a radial direction of the electromagnetic control device. The locking clip holder limits the movement of the locking clip in the direction of the profile of the axis, wherein the locking clip holder has a recess, in order to define the position of the locking clip in the radial direction.

Advantageously, the locking clip holder is used, on one hand, for the connection between the locking clip and housing; the radial fixing prevents, for example, the locking clip from falling out during transport or installation. On the other hand, the recess enables interaction of the locking section with a locking contour of the component holding the electromagnetic control unit, in that, in particular, the movement of the locking clip in the direction of the profile of the axis is limited; movement parallel to the movement direction of the armature is thus limited.

In another advantageous embodiment, the locking clip can be brought into contact with a clamping contour, wherein the clamping contour is arranged on the locking clip holder. In particular, the clamping contour can extend with a ramp-shaped construction in the direction of the housing.

Alternatively, the locking clip is constructed to be able to be brought into contact with an (alternative or additional) clamping contour, wherein the clamping contour is arranged on the component holding the electromagnetic control device.

One advantageous refinement of the embodiment involves a locking clip with legs that are connected to each other by the connection section and are spaced apart from each other, wherein a tensioning section connects to the locking section on the end of the leg at a distance from the connection section, in that the distance to the opposing leg increases toward the end facing away from the connection section, and wherein the tensioning section can be brought into contact with the clamping contour. Thus, advantageously, the legs of the locking clip can be pressed apart, whereby the installation and removal are simplified.

In one advantageous embodiment, the clamping contour is arranged on the component holding the electromagnetic control device, wherein the (alternative or additional) clamping contour is a surface arranged perpendicular to the axis of the electromagnetic control device with a slope running in the axial direction of the electromagnetic control device—with reference to the fastened state. Advantageously, the legs of the locking clip are simultaneously pressed outward by an axial displacement of the electromagnetic control unit, so that engagement of the locking sections of the locking clip in the locking contour of the component holding the electromagnetic control device is made easier.

In another advantageous embodiment, the locking contour of the component holding the electromagnetic control device is a groove.

Another advantageous embodiment involves an electromagnetic control device with a locking clip, wherein—in a non-tensioned state of the two legs spaced apart from each other—the distance between the indentation forming the locking section and the opposing leg on the end facing away from the connection section is less than on the end facing the connection section, wherein at least one wall of the groove and the groove base enclose an angle that deviates from 90 degrees.

BRIEF DESCRIPTION OF THE DRAWINGS

The invention will now be explained in more detail with reference to an embodiment, wherein reference is made to the drawings. Functionally identical elements of the explained embodiments are marked with identical reference symbols.

DETAILED DESCRIPTION

Figure 1:
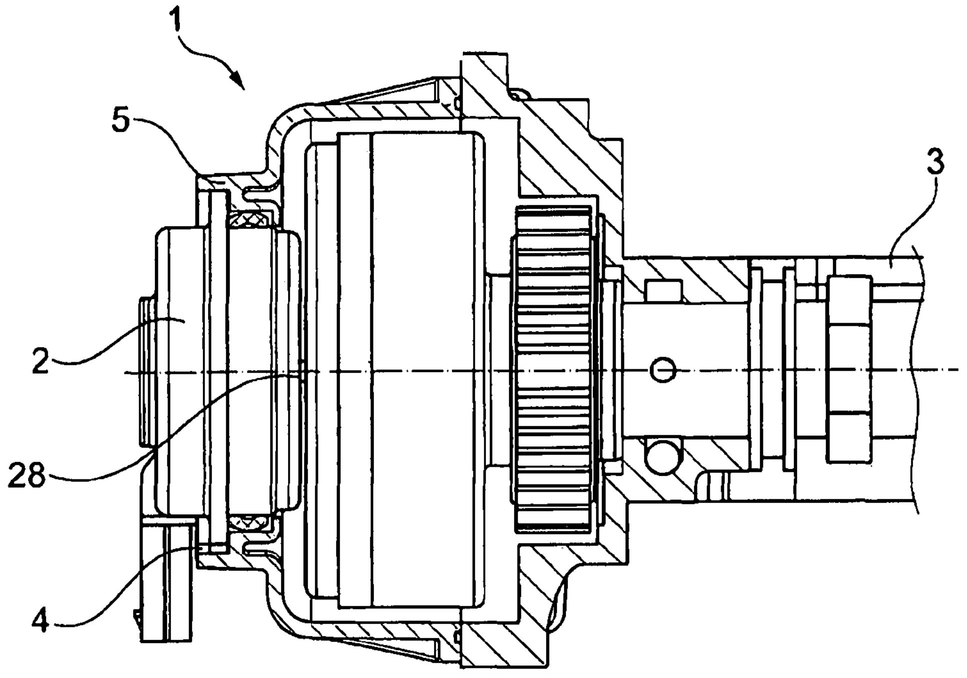
Prior Art Fig. 1
FIG. 1 shows an arrangement according to the prior art.

In FIG. 1, an exemplary embodiment of an arrangement known from DE 10 2010 012 917 A1 consisting of camshaft adjuster 1, control valve (not shown), and electromagnetic control device 2 is shown. Camshaft adjusters 1 fulfill the function of setting the angular position of a camshaft 3 with reference to the crankshaft of an internal combustion engine (not shown). The shown camshaft adjuster 1 is actuated by hydraulic medium originating from the engine oil circuit: an inner rotor is surrounded by an outer stator, wherein pressure chambers are formed between the rotor and stator (not shown). The pressure chambers are in turn divided by a vane into work chambers A and B that are provided with hydraulic medium as a function of the switch position of the control valve. A pressure difference between the work chambers A and B leads to an adjustment of the relative angular position of the camshaft 3.

The control valve is constructed as a central valve and is supported on a recess of the camshaft 3. The axial position of the control piston that is supported so that it is longitudinally displaceable in the central valve housing defines the hydraulic medium path that can run from an intake connection via supply connections A and B to the work chambers A and B, respectively. The axial position of the control piston is set by the electromagnetic control device 2 that can actuate the control piston by energization against the force of a spring. The electromagnetic control device 2 is fastened in the area of the fastening section 4 by a so-called bayonet coupling on a component 5 of the internal combustion engine. The component 5 is attached in turn on a cover of the timing case. The component holding the electromagnetic control device, however, can also be the cover of the control drive directly, e.g., the cover of the timing drive.

Figure 2:
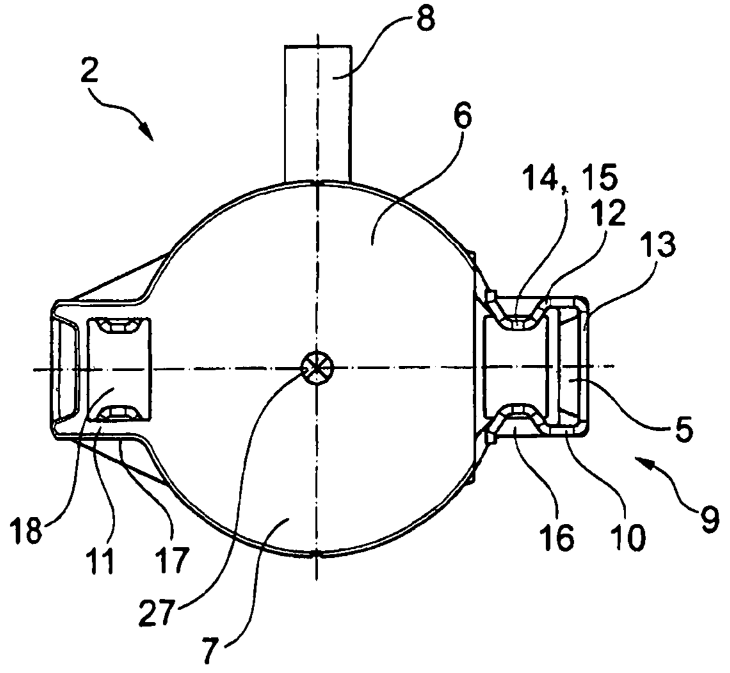
FIG. 2 shows a top view of an embodiment of the electromagnetic control device according to the invention.

In FIG. 2, a top view of an embodiment of the electromagnetic control device 2 according to the invention is shown. The electromagnetic control device 2 comprises a housing 6 that comprises a plastic overmolding 7, wherein a connector 8 for voltage supply is formed on the housing 6 and also two fastening units 9.

The electromagnetic control device 2 is constructed as a pressing proportional magnet and comprises—as is known from the prior art—among other things, a magnetic coil that encloses a coil space and an armature and a pole core that bounds the coil space at one axial end (not shown). The armature is connected rigidly to a push rod 28. The push rod 28 passes through the pole core at an opening and contacts an end surface of a control valve held partially by a camshaft. The armature is arranged within a coil space so that it is axially displaceable and defines an axis 27 and—derived from this—an axial and radial direction of the electromagnetic control device.

Each fastening unit 9 extends as an extension of the plastic overmolding 7 of the housing 6 in the radial direction and is used for fastening to a component 5 holding the electromagnetic control device 2. Each fastening unit 9 comprises a locking clip 10 and a housing-side locking clip holder 11.

The locking clip 10 has two legs 12 and a connection section 13 and also a locking section 14 on each of the legs 12. The locking section 14 interacts with a locking contour of the component 5 holding the electromagnetic control device 2 such that a permanent fastening of the electromagnetic control device 2 on the component 5 holding the control device is enabled. The locking contour on the holding component 5 is constructed as groove 20 in which the locking clip 10 engages with its locking section 14 constructed as an indentation 15 pointing toward the opposing leg 12 (see also FIG. 4).

The locking clip holder 11 has a slot-shaped holder 16 on whose base a recess 17 is arranged. The locking section 14 of the locking clip 10 constructed as an indentation 15 engages in the recess 17, whereby the movement of the locking clip 10 is limited not only in the axial direction, but also in the radial direction. The fastening unit 9 further shows a passage 18 through which a pin 19 of the component 5 holding the electromagnetic control device 2 can engage (see also FIG. 4). A groove 20 that forms the locking contour used for the fastening is arranged on the pin 19.

Figure 3:
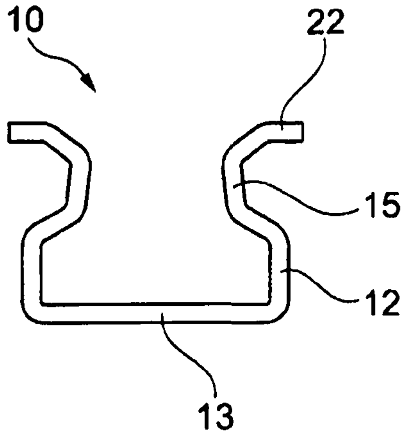
FIG. 3 shows the locking clip of the embodiment of FIG. 2.

FIG. 3 shows a construction of the locking clip 10 with two legs 12 and an intermediate connection section 13. Each leg 12 has an indentation 15 that extends toward each opposing leg 12 and forms a locking section 14. The indentation 15 is shaped for locking on the locking contour 21 of the component 5 holding the electromagnetic control device 2, in that the indentation 15 engages in a groove 20.

On the end of the leg 12 at a distance from the connection section 13, a tensioning section 22 attaches to the locking section 14 in that the distance to the opposing leg 12 increases toward the end facing away from the connection section 13. The tensioning section 22 can be brought into contact with a clamping contour 23, shown in FIG. 4, wherein the clamping contour 23 is arranged on the locking clip holder 11. A movement of the locking clip 10 in the radial direction toward the inside causes a spreading of the locking clip 10, which makes the fastening or disconnecting of the connection between the electromagnetic control device 2 and holding component 5 easier.

Figure 4:
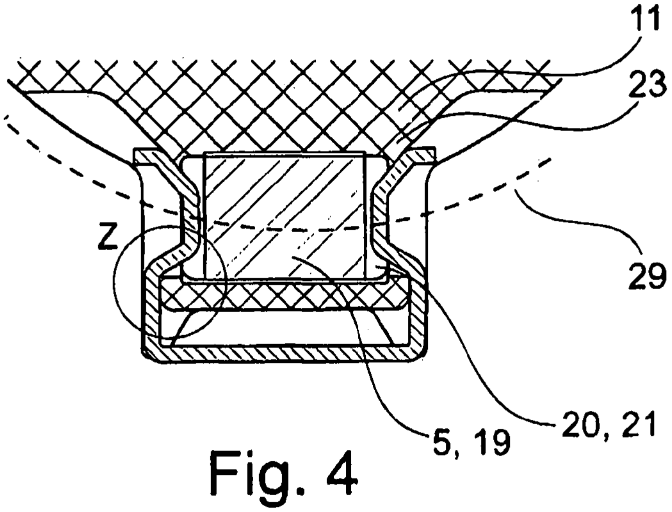
FIG. 4 shows a first section view of the fastening unit of the embodiment of FIG. 2.

In FIG. 4, it is also shown in what way the locking clip holder 11, the locking clip 10, and the pin 19 of the component 5 holding the electromagnetic control device 2 interact as the fastening unit 9. The locking clip 10 is inserted in the radial direction into the slot-like holder 16 of the locking clip holder 11. The indentations 15 of the locking clip 10 engage in the recess 17 that is arranged at the base of the slot.

Figure 5:
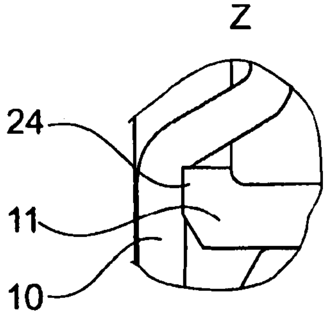
FIG. 5 shows a detail of the fastening unit from FIG. 4.

The two legs 12 can be tensioned against each other. In a non-tensioned state of the two legs 12 spaced apart from each other, the distance between the indentation 15 forming the locking section 14 and the opposing leg 12 on the end facing away from the connection section 13 is thus smaller than on the end facing the connection section 13. The direction of the tensioning force runs essentially tangential to a circular line 29 drawn around the axis 27 of the electromagnetic control device 2; consequently, the movement of the locking clip 10 is limited not only in the axial direction, but also in the radial direction. The fastening unit 9 further shows a passage 18 through which a pin 19 of the component 5 holding the electromagnetic control device 2 engages. A groove 20 that forms the locking contour 21 used for the fastening is arranged on the pin 19. The detail Z of the fastening unit 9 from FIG. 4 is shown in FIG. 5. A back-cut section 24 of the locking clip holder 11 is shown, in which the locking clip 10 engages. The back-cut section 24 secures the locking clip 10 against falling out, for example, during transport or installation.

Figure 6:
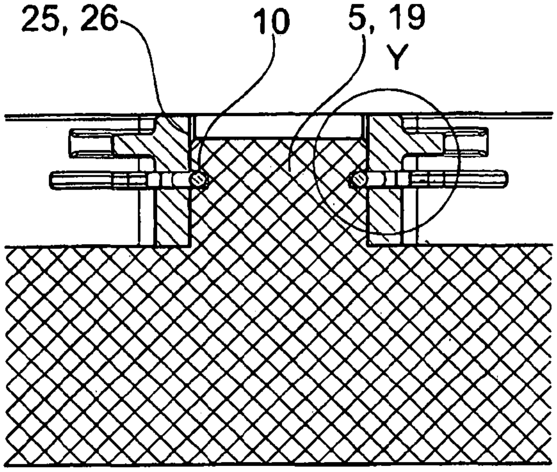
FIG. 6 shows a second section view of the fastening unit of the embodiment of FIG. 2.
Figure 7:
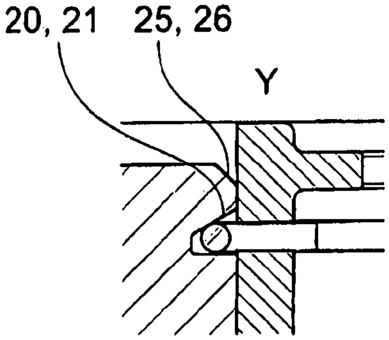
FIG. 7 shows a detail of the fastening unit from FIG. 6.

FIG. 6 shows a second section view of the fastening unit 9 of the electromagnetic control device 2. Shown is a locking clip 10 that is constructed to be able to be brought into contact with an alternative or additional clamping contour 25, wherein the alternative or additional clamping contour 25 is arranged on the component 5 holding the electromagnetic control device 2. The alternative or additional clamping contour 25 is a surface 26 arranged perpendicular to the axis 27 of the electromagnetic control device with a slope running in the axial direction of the electromagnetic control device; for the installation of the electromagnetic control device, a pin 19 engages through the passage 18 of the locking clip holder 11. The alternative or additional clamping contour 25 causes, during the installation, a spreading of the locking clip 10, which makes the engagement of the locking sections 14 in the groove 20 of the pin easier. The detail Y of FIG. 6 is shown in FIG. 7. A contour of the groove 20 whose wall and groove base enclose an angle that deviates from 90 degrees is shown.

LIST OF REFERENCE SYMBOLS

1 Camshaft adjuster
2 Electromagnetic control unit
3 Camshaft
4 Fastening section
5 Component
6 Housing
7 Plastic overmolding
8 Connector
9 Fastening unit
10 Locking clip
11 Locking clip holder
12 Leg
13 Connection section
14 Locking section
15 Indentation
16 Slot-like holder
17 Recess
18 Passage
19 Pin
20 Groove
21 Locking contour
22 Tensioning section
23 Clamping contour
24 Back-cut section
25 Alternative or additional clamping contour
26 Surface
27 Axis
28 Push rod
29 Circular line (reference line)

The invention claimed is:

1. An electromagnetic control device comprising:
a housing that has a plastic overmolding,
a fastening unit adapted to connect to a component that holds the electromagnetic control device,
the fastening unit comprises a locking clip and a housing-side locking clip holder, the locking clip including two legs and one connection section extending between the two legs, and a locking section on at least one of the legs, the locking section being adapted to interact with a locking contour of the component that holds the electromagnetic control device,
the locking clip is brought into contact with a clamping contour arranged on the locking clip holder or the locking clip is adapted to be brought into contact with a clamping contour arranged on the component that holds the electromagnetic control device,
wherein the legs of the locking clip are spaced apart from each other, a tensioning section is located on an end of one of the legs connected to the locking section and at a distance from the connection section, a distance to an opposing one of the legs increases toward an end facing away from the connection section, and the tensioning section is brought into connection with the clamping contour.

2. An electromagnetic control device comprising:
a housing that has an overmolding,
a fastening unit adapted to connect to a component that holds the electromagnetic control device,
the fastening unit comprises a locking clip and a housing-side locking clip holder, the locking clip including two legs and one connection section extending between the two legs, and a locking section on at least one of the legs, the locking section extending at least partially into a passage in the locking clip holder and being adapted to interact with a locking contour of the component that holds the electromagnetic control device, wherein the component that holds the electromagnetic control device is adapted to be received in the passage.

3. The electromagnetic control device according to claim 2, wherein each of the legs includes one of the locking sections, and the locking sections extend toward one another, and each of the locking sections extends into the passage in the locking clip holder.

4. The electromagnetic control device according to claim 2, wherein the locking section is formed by an indentation.

5. The electromagnetic control device according to claim 2, further comprising an electromagnetic unit with an armature having a longitudinal axis that defines an axis of the electromagnetic control device, and the two legs are tensionable relative to each other, and a direction of a tensioning force of the two legs runs tangential to a circle line that extends around the axis.

6. The electromagnetic control device according to claim 2, wherein there are two of the fastening units that are adapted to connect to the component that holds the electromagnetic control device located on opposite sides of the housing, the locking clip holders of each of the fastening units having respective ones of the passages that are adapted to receive a pin of the component that holds the electromagnetic control device.

7. An assembly comprising the electromagnetic control device according to claim 2 and the component that holds the electromagnetic control device, the locking contour of the component that holds the electromagnetic control device is a groove, and the locking section is received in the groove.

8. The assembly according to claim 7, wherein the component that holds the electromagnetic control device includes a pin that is received in the passage, and the groove is located on the pin, and the pin includes a sloped contour on an end face that is adapted to be inserted first into the passage for engaging and spreading apart the legs.

* * * * *